United States Patent [19]

Finlayson et al.

[11] 4,410,364

[45] Oct. 18, 1983

[54] PRINTING INK COMPOSITIONS

[75] Inventors: Claude M. Finlayson, Houston, Tex.; Wilbur S. Mardis, Trenton, N.J.

[73] Assignee: NL Industries, Inc., New York, N.Y.

[21] Appl. No.: 313,032

[22] Filed: Oct. 19, 1981

Related U.S. Application Data

[63] Continuation-in-part of Ser. No. 207,542, Nov. 17, 1980.

[51] Int. Cl.³ .............................................. C09D 11/02
[52] U.S. Cl. ..................................... 106/20; 106/14.5; 252/315.2
[58] Field of Search ..................... 106/14.5, 30, 20, 32, 106/23; 252/316

[56] References Cited

U.S. PATENT DOCUMENTS

| | | | |
|---|---|---|---|
| 2,531,440 | 11/1950 | Jordan | 252/28 |
| 2,548,679 | 4/1951 | Olin | 260/567.6 |
| 2,739,067 | 3/1956 | Ratcliffe | 106/30 |
| 2,750,296 | 6/1956 | Curado et al. | 106/30 |
| 2,754,219 | 7/1956 | Voet et al. | 106/32 |
| 2,859,234 | 11/1958 | Clem | 260/448 |
| 2,885,360 | 5/1959 | Haden, Jr. et al. | 252/28 |
| 3,461,163 | 8/1969 | Boothe | 260/567.6 |
| 3,472,740 | 10/1969 | Boothe | 203/37 |
| 3,537,994 | 11/1970 | House | 252/13 |
| 3,929,849 | 12/1975 | Oswald | 260/448 C |
| 3,945,836 | 3/1976 | Miyata | 106/22 |
| 4,105,578 | 8/1978 | Finlayson et al. | 252/316 |

*Primary Examiner*—John Kight, III
*Assistant Examiner*—Amelia B. Yarbrough

[57] ABSTRACT

Printing inks are provided comprising an organic ink vehicle having dispersed therein an ink coloring material and an organophilic clay gellant. The organophilic clay gellant comprises the reaction product of an organic cation, an organic anion and a smectite-type clay having a cation exchange capacity of at least 75 milliequivalents per 100 grams of said clay such that an organic cation - organic anion complex is intercalated with the smectite-type clay and the cation exchange sites of the smectite-type clay are substituted with the organic cation.

8 Claims, No Drawings

PRINTING INK COMPOSITIONS

This application is a continuation-in-part application of pending prior application Ser. No. 207,542 filed on Nov. 17, 1980.

This invention relates to improved printing inks and more particularly to printing inks adapted for high speed printing operations. The improved ink employs novel organophilic clay complexes which are dispersible in an organic vehicle to form a gel therein.

The greatly expanded circulation of modern newspapers has brought about the development and use of high speed presses in the printing industry. This has required printing inks which set rapidly. Such high speed presses require inks which will set in a matter of seconds and maintain a proper balance of tack, penetration and body control.

Inks with too high a degree of tack may cause the paper to tear or the ink to mist at high-press speeds. Ink with insufficient tackiness will not transfer properly in the printing operation. If penetration of the ink is too great, the print becomes visible from the opposite side of the paper, or causes blurring of figures. Poorly controlled penetration may result in smudging after the ink has been supposedly set. An ink must have body to prevent centrifugal throw-off at high press speeds. In contrast, too viscous an ink will not flow properly from the fountains to the rollers.

These variations and the conditions that are necessary to be met make it mandatory for the ink industry to rely on a large number of formulations. For example, U.S. Pat. No. 2,750,296 discloses a printing ink containing coloring matter dispersed in a vehicle comprising an oil-soluble resinous binder material dissolved in mineral oil, and containing therein a long chain aliphatic amine bentonite containing 34 carbon atoms in the aliphatic chain. In contrast, U.S. Pat. No. 2,754,219 discloses the formation of an anti-misting printing ink prepared by adding to an ink, whose principal vehicle constituent is a hydrocarbon containing an aromatic constituent, a finely divided organic derivative of montmorillonite in which the organic constituent includes a chain of at least 12 carbon atoms. In addition to these United States patents, U.S. Pat. No. 2,739,067 discloses a printing ink containing a modified clay which forms a gel in the organic vehicle and has a substantial gel characteristic therein. The prior art compounds, however, have all suffered from various disadvantages. For example, some require the undesirable use of polar dispersion additives which may react with other ink formulation components eliminating essential ink properties whereas others require numerous shearing actions through a roller mill to produce a viscosity stable material which viscosity will not increase on storage with attendant high-labor costs, and concomitant production shut down.

In contrast to these prior art techniques, U.S. Pat. No. 4,193,806 discloses the preparation of a storage-stable printing ink comprising an organic ink vehicle and an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms. The printing inks of this U.S. patent are disclosed as being able to attain full viscosity levels following one pass over a three roll mill in contrast to prior comparative gellants which continue to increase in viscosity. While this patented printing ink has advanced the state of the art to new levels, further advancement and improvement is necessary to eliminate the need to perform a prior high shearing action to attain acceptable viscosity levels.

A printing ink containing a viscosity increasing additive having enhanced properties has been unexpectedly discovered comprising an organic ink vehicle having dispersed therein an ink coloring material and an organophilic clay gellant comprising the reaction product of smectite-type clay, an organic cation and an organic anion.

In particular, a printing ink is disclosed which comprises an organic ink vehicle having dispersed therein an ink coloring material and an organophilic clay gellant comprising the reaction product of an organic cation, an organic anion, and a smectite-type clay having a cation exchange capacity of at least 75 milliequivalents per 100 grams of said clay such that an organic cation—organic anion complex is intercalated with the smectite-type clay and cation exchange sites of the smectite-type clay are substituted with the organic cation.

The printing inks of this invention comprises an organic ink vehicle having dispersed therein an ink coloring material and an organophilic clay gellant. The organic ink vehicle comprises a solvent and binder. The solvent is a high boiling hydrocarbon. The solvent is preferably a high boiling aliphatic solvent, or a mixture of such solvents. The binder is a synthetic or natural resin having film forming properties and is used as a carrier for the pigment. The type of binder used depends on the application. Binders which may be employed include drying oil varnish, alkyd resins, polyester vehicles, and urethane alkyds. Ink coloring materials comprise pigments or predispersed pastes. The predispersed pastes contain a pigment, a vehicle, and solvent. Other additives may be incorporated in the printing ink to modify the ink properties for special applications. These additives may include wax compounds, driers, dispersants, pigment extenders and antioxidants.

The organophilic clays of this invention can be prepared by conventional methods, such as described in U.S. Pat. No. 4,105,578. Preferably they are prepared by:

(a) slurrying a smectite-type clay in water at amounts of 1% to 80% by weight of said clay;

(b) heating the slurry to a temperature between 20° C. and 100° C.;

(c) adding 5 to 100 milliequivalents of an organic anion per 100 grams of clay, 100% active clay basis and an organic cation in a sufficient amount to satisfy the cation exchange capacity of the smectite-type clay and the cationic activity of the organic anion while agitating the reaction solution;

(d) reacting the mixture for a sufficient time to form a reaction product comprising an organic cation-organic anion complex which is intercalated with the smectite-type clay and the cation exchange sites of the smectite-type clay are substituted with the organic cation; and (e) recovering the reaction product.

The organic cationic and organic anionic compounds useful in this invention may be selected from a wide range of materials.

The organic cationic compounds should be capable of forming an organophilic clay by exchange of cations with the smectite-type clay. The organic cationic compound must have a positive charge localized on a single atom or on a small group of atoms within the compound. Preferably the organic cation is selected from the group consisting of quaternary ammonium salts, phosphonium salts, sulfonium salts and mixtures thereof wherein the organic cation contains at least one linear or branched alkyl group having 8 to 60 carbon atoms. More preferably, the organic cation optimally contains one member selected from a first group consisting of a $\beta,\gamma$-unsaturated alkyl group, and a hydroxyalkyl group having 2 to 6 carbon atoms and mixtures thereof.

The representative organic cations of the invention may be selected from a group consisting of the formulae:

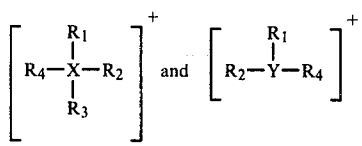

wherein X is nitrogen or phosphorus, Y is sulfur, $R_1$ is an alkyl group having 8 to 60 carbon atoms; and $R_2$, $R_3$ and $R_4$ are individually selected from the group consisting of (a) hydrogen; (b) saturated and unsaturated alkyl groups containing 1 to 22 carbon atoms; (c) aryl groups; (d) aralkyl groups containing 1 to 22 carbon atoms on the alkyl chain, (e) hydroxyalkyl group having 2 to 6 carbon atoms; and mixtures thereof.

$R_1$

The long chain alkyl radical may be branched or unbranched, saturated or unsaturated, substituted or unsubstituted and should have from 8 to 60 carbon atoms in the straight chain portion of the radical. Preferably, $R_1$ is an alkyl group having 12 to 22 carbon atoms.

The long chain alkyl radicals may be derived from naturally occurring oils including various vegetable oils, such as corn oil, coconut oil, soybean oil, cottonseed oil, and castor oil and various animal oils and fats such as tallow oil. The alkyl radicals may be derived synthetically from sources such as alpha olefins.

Representative examples of useful branched, saturated alkyl radicals include 12-methylstearyl; and 12-ethylstearyl. Representative examples of useful branched, unsaturated radicals include 12-methyloleyl and 12-ethyloleyl. Representative examples of unbranched saturated radicals include lauryl; stearyl; tridecyl; myristal (tetradecyl); pentadecyl; hexadecyl; hydrogenated tallow, docosonyl. Representative examples of unbranched, saturated alkyl radicals include lauryl; stearyl; tridecyl; myristyl (tetradecyl); pentadecyl; hexadecyl; hydrogenated tallow, and docosonyl. Representative examples of unbranched, unsaturated and unsubstituted long chain alkyl radicals include oleyl, linoleyl; linolenyl, soya and tallow.

$R_2$, $R_3$, $R_4$ $R_2$, $R_3$, and $R_4$ are individually selected from the group consisting of hydrogen; a saturated and unsaturated alkyl group containing 1 to 22 carbon atoms; an aryl group; an aralkyl group containing 1 to 22 carbon atoms in the alkyl chain of the aralkyl group, hydroxyalkyl group having 2 to 6 carbon atoms, and mixtures thereof.

The saturated and unsaturated alkyl group containing 1 to 22 carbon atoms may be linear or branched, cyclic or acyclic, substituted or unsubstituted. Representative examples of useful alkyl groups include methyl; ethyl; propyl; 2-propyl; iso-butyl; cyclopentyl; and cyclohexyl.

The $\beta,\gamma$-unsaturated alkyl group may be selected from a wide range of materials. These compounds may be cyclic or acyclic, unsubstituted or substituted with aliphatic radicals containing up to 3 carbon atoms such that the total number of aliphatic carbons in the $\beta,\gamma$-unsaturated radical is 6 or less. The $\beta,\gamma$-unsaturated alkyl radical may be substituted with an aromatic ring that likewise is conjugated with the unsaturation of the $\beta,\gamma$ moiety or the $\beta,\gamma$-radical is substituted with both an aliphatic radical and aromatic ring.

Representative examples of cyclic $\beta,\gamma$-unsaturated alkyl groups include 2-cyclohexenyl and 2-cyclopentenyl. Representative examples of acyclic $\beta,\gamma$-unsaturated alkyl groups containing 6 or less carbon atoms include propargyl; 2-propenyl; 2-butenyl; 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include 3-phenyl-2-propenyl; 2-phenyl-2-propenyl; 3-(4-methoxy-phenyl)-2-propenyl. Representative examples of aromatic and aliphatic substituted materials include 3-phenyl-2-cyclohexenyl; 3-phenyl-2-cyclopentenyl; an alkyl group may be substituted with an aromatic ring.

The alkyl radicals may be derived from similar sources as the long chain alkyl radical, $R_1$, above.

Examples of aryl groups would include phenyl such as in N-alkyl and N,N-dialkyl anilines, wherein the alkyl groups contain between 1 to 22 carbon atoms; ortho-, meta- and para-nitrophenyl, ortho-, meta- and para-alkyl phenyl, wherein the alkyl group contains between 1 and 22 carbon atoms, 2-, 3-, and 4-halophenyl wherein the halo group is defined as chloro- bromo-, or iodo-, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

Representative examples of an aralkyl group, that is benzyl and substituted benzyl moieties, would include benzyl and those materials derived from, e.g. benzyl halides, benzhydryl halides, trityl halides, 1-halo-1-phenylalkanes wherein the alkyl chain has from 1 to 22 carbon atoms such as 1-halo-1-phenylethane; 1-halo-1-phenyl propane; and 1-halo-1-phenyloctadecane; substituted benzyl moieties such as would be derived from ortho-, meta- and para-chlorobenzyl halides, para-methoxybenzyl halides; ortho-, meta- and para-nitrilobenzyl halides, and ortho-, meta- and para-alkylbenzyl halides wherein the alkyl chain contains from 1 to 22 carbon atoms; and fused ring benzyl-type moieties such as would be derived from 2-halomethylnaphthalene, 9-halomethylanthracene and 9halomethylphenanthrene, wherein the halo group would be defined as chloro-, bromo-, iodo-, or any other such group which serves as a leaving group in the nucleophilic attack of the benzyl type moiety such that the nucleophile replaces the leaving group on the benzyl type moiety.

The hydroxyalkyl group is selected from a hydroxyl substituted aliphatic radical wherein the hydroxyl is not substituted at the carbon adjacent to the positively charged atom and the group has from 2 to 6 aliphatic carbons. The alkyl group may be substituted with an aromatic ring independently from the 2 to 6 aliphatic carbon atoms.

Representative examples inlcude 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohxyl; 2-hydroxycyclopentyl; 3-hydroxycyclopentyl; 2-methyl-2-hydroxypropyl; 1,1,2-trimenthyl-2-hydroxypropyl; 2-phenyl-2-hydroxyethyl; 3-methyl-2-hydroxybutyl; and 5-hydroxy-2-pentenyl.

Organic cationic salts may be prepared by methods disclosed in U.S. Pat. Nos. 2,355,356, 2,775,617 and 3,136,819. The anion associated with the organic cation compound is preferably selected from the group consisting of chloride and bromide, and mixtures thereof, and is more preferably chloride, although other anions such as iodide acetate, hydroxide, nitrite, etc., may be present in the organic cationic compound to neutralize the cation.

The organic anions should be capable of reacting with an organic cation and form intercalations with a smectite-type clay as an organic cation-organic anion complex. The molecular weight (gram molecular weight) of the organic anion is preferably 3,000 or less, and most preferably 1,000 or less and contains at least one acidic moiety per molecule as disclosed herein. The organic anion is preferably derived from an organic acid having a $pK_A$ less than about 11.0. As indicated, the source acid must contain at least one ionizable hydrogen having the preferred $pK_A$ in order to allow the formation of the organic cation-organic anion complex and subsequent intercalation reaction to occur.

Also useable is any compound which will provide the desired organic anion on hydrolysis. Representative compounds include:
(1) acid anhydrides including acetic anhydride, maleic anhydride, succinic anhydride and phthalic anhydride;
(2) acid halides including acetyl chloride, octanoyl chloride, lauroyl chloride, lauroyl bromide and benzoyl bromide;
(3) 1,1,1-trihalides including 1,1,1-tri-chloroethane and 1,1,1-tribromooctane; and;
(4) orthoesters including ethylorthoformate and ethylorthostearate.

The organic anions may be in the acid or salt form. Salts may be selected from alkali metal salts, alkaline earth salts, ammonia, and organic amines. Representative salts include: hydrogen, lithium, sodium, potassium, magnesium, calcium, barium, ammonium and organic amines such as ethanolamine, diethanolamine, triethanolamine, methyl diethanolamine, butyl diethanolamine, diethyl amine, dimethyl amine, triethyl amine, dibutyl amine, and so forth, and mixtures thereof. The preferred alkali metal salt is sodium.

Suitable acidic functional organic compounds useful in this invention include:
(1) Carboxylic acids including:
(a) benzenecarboxylic acids such as benzoic acid; ortho-, meta- and para-phthalic acid, 1,2,3-benzenetricarboxylic acid; 1,2,4-benzenetricarboxylic acid; 1,3,5-benzenetricarboxylic acid; 1,2,4,5-benzenetetracarboxylic acid; 1,2,3,4,5,6-benzenehexacarboxylic acid (mellitic acid);

(b) alkyl carboxylic acids having the formula H—(CH$_2$)n—COOH, wherein n is a number from 0 to 20, such compounds include acetic acid; propionic acid; butanoic acid; pentanoic acid; hexanoic acid; heptanoic acid; octanoic acid; nonanoic acid; decanoic acid; undecanoic acid; lauric acid; tridecanoic acid; tetradecanoic acid; pentadecanoic acid; hexadecanoic acid; heptadecanoic acid; octadecanoic acid (stearic acid); nonadecanoic acid; and eicosonic acid;
(c) alkyl dicarboxylic acid having the formula HOOC—(CH$_2$)n—COOH, wherein n is 0 to 8 such as oxalic acid; maleic acid; succinic acid; glutaric acid; adipic acid; pimelic acid; suberic acid; azelaic acid; sebacic acid;
(d) hydroxyalkyl carboxylic acids such as citric acid; tartaric acids; malic acid; mandelic acid; and 12-hydroxystearic acid;
(e) unsaturated alkyl carboxylic acids such as maleic acid; fumaric acid; and cinnamic acid;
(f) fused ring aromatic carboxylic acids such as naphthalenic acid; and anthracene carboxylic acid;
(g) cycloaliphatic acids such as cyclohexane carboxylic acid; cyclopentane carboxylic acid; furan carboxylic acids.
(2) Organic sulfur acids including:
(a) sulfonic acids including:
(1) benzenesulfonic acids such as benzenesulfonic acid; phenolsulfonic acid; dodecylbenzene sulfonic acid; benzenedisulfonic acid; benzenetrisulfonic acids; para-toluenesulfonic acid; and
(2) alkyl sulfonic acids such as methane sulfonic acid; ethane sulfonic acid; butane sulfonic acid; butane disulfonic acid; sulfosuccinate alkyl esters such as dioctyl succinyl sulfonic acid; and alkyl polyethoxy-succinyl sulfonic acid; and
(b) alkyl sulfates such as the lauryl half ester of sulfuric acid and the octadecyl half ester of sulfuric acid.
(3) Organophosphorus acids including:
(a) phosphonic acids having the formula:

wherein R is an aryl group or alkyl having 1 to 22 carbon atoms;
(b) phospinic acids having the formula:

wherein R is an aryl group or alkyl group having 1 to 22 carbon atoms, such as dicyclohexyl phosphinic acid; dibutyl phosphinic acid; and dilauryl phosphinic acid;
(c) thiophosphinic acids having the formula:

wherein R is an aryl group or alkyl group having 1 to 22 carbon atoms such as di-iso-butyl dithiophosphinic acid; dibutyl dithiophosphinic acid; dioctadecyl dithiophosphinic acid; butyl dithiophosphinic acid; dioctadecyl dithiophosphinic acid;

(d) phosphites, that is diester of phosphorous acid having the formula HO—P(OR)2 wherein R is an alkyl group having 1 to 22 carbon atoms such as dioctadecylphosphite;

(e) phosphates, that is diesters of phosphoric acid having the formula:

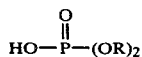

wherein R is an alkyl group having 1 to 22 carbon atoms, such as dioctadecyl phosphate.

(4) Phenols such as phenol; hydroquinone; t-butylcatechol; p-methoxyphenol; and naphthols.

(5) Thioacids having the formulae:

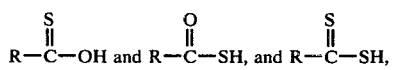

wherein R is an aryl group or alkyl group having 1 to 22 carbon atoms, such as thiosalicylic acid; thiobenzoic acid; thioacetic acid; thiolauric acid; and thiostearic acid.

(6) Amino acids such as the naturally occuring amino acids and derivatives thereof such as 6-aminohexanoic acid; 12-aminododecanoic acid; N-phenylglycine; and 3-aminocrotonoic acid.

(7) Polymeric acids prepared from acidic monomers wherein the acidic function remains in the polymer chain such as low molecular weight acrylic acid polymers and copolymers; and styrene maleic anhydride copolymers.

(8) Miscellaneous acids and acid salts such as ferrocyanide; ferricyanide; sodium tetraphenylborate; phosphotungstic acid; phosphosilicic acid, or any other anion which will form a tight ion pair with an organic cation, i.e., any such anion which forms a water insoluble precipitate with an organic cation.

The organophilic clays of this invention can be prepared by admixing the clay, organic cation, organic anion and water together, preferably at a temperature within the range from 20° C. to 100° C., more preferably 37° C. to 77° C., for a period of time sufficient for the organic cation and organic anion complex to intercalate with the clay particles, followed by filtering, washing, drying and grinding. The addition of the organic cation and organic anion may be done either separately or as a complex. In using the organophilic clays in emulsions, the drying and grinding steps may be eliminated. When the clay, organic cation, organic anion and water together are in such concentrations that a fluid slurry is not formed, the filtration and washing steps can be eliminated.

The clay is preferably dispersed in water at a concentration from about 1 to 80% and preferably 2% to 7% to form a clay slurry. The clay slurry may be optionally centrifuged to remove non-clay impurities which constitute about 10% to about 50% of the starting clay composition. The slurry is preferably pre-heated under agitation to a temperature in the range from 35° C. to 77° C. before addition of the organic reactants.

The organophilic clays of the invention may be prepared by admixing the organic anion with a clay and water together, preferably at a temperature between 20° C. and 100° C. for a sufficient time to prepare a homogenous mixture followed by the addition of the organic cation in sufficient amounts to satisfy the cation exchange capacity of the clay and the cationic capacity of the organic anion. The mixture is reacted with agitation at a temperature between 20° C. and 100° C. for a sufficient time to allow the formation of an organic cation-organic anion complex which is intercalated with the clay and the cation exchange sites of the clay are substituted with the organic cation. Reaction temperatures below 20° C. or above 100° C. while useable are not preferred.

The amount of organic anion added to the clay for purposes of this invention should be sufficient to impart to the organophilic clay the enhanced dispersion characteristic desired. This amount is defined as the milliequivalent ratio which is the number of milliequivalents (M.E.) of the organic anion in the organoclay per 100 grams of clay, 100% active clay basis. The organophilic clays of this invention should preferably have an anion milliequivalent ratio of 5 to 100, and more preferably 10 to 50. Use of the organic anion at lower or higher milliequivalent ratios has a detrimental effect on the organophilic clay reaction product.

The organic anion is preferably added to the reactants in the desired milliequivalent ratio as a solid or solution in water under agitation to effect a homogenous mixture.

The organic cation should be employed in a sufficient quantity to at least satisfy the cation exchange capacity of the clay and the cationic activity of the organic anion. Additional cation above the sum of the exchange capacity of the clay and anion may be optionally used. It has been found when using the smectite-type clays of this invention that use of at least 90 milliequivalents of organic cation is sufficient to satisfy at least a portion of the total organic cation requirement. Use of amounts from 80 to 200 M.E., and preferably 100 to 160 M.E. are acceptable.

For convenience of handling it is preferred that the total organic content of the organophilic clay reaction products of this invention should be less than about 50% by weight of the organoclay. Higher amounts are usable, but the reaction product is difficult to filter, dry and grind.

The clays used to prepare the organophilic clay gellants of this invention are smectite-type clays which have a cation exchange capacity of at least 75 milliequivalents per 100 grams of clay. Particularly desirable types of clay are the naturally-occuring Wyoming varieties of swelling bentonites and like clays and hectorite, a swelling magnesium-lithium silicate clay.

Smectite-type clays occur naturally or are prepared synthetically by either pneumatalytic or hydrothermal synthesis processes. Suitable clays include montmorillonite, bentonite, beidellite, hectorite, saponite, and stevensite.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate and sodium hydroxide, under shear in a pugmill or extruder.

The cation exchange capacity of the smectite-type clays can be determined by the ammonium acetate method.

The printing ink is prepared in an economical and practical manner by simply incorporating the organophilic clay gellants into a basic ink composition containing an ink coloring material and an organic ink vehicle.

The ink compositions prepared with the compositions of this invention achieve high viscosity levels by merely being stirred into the ink formulation and do not require passage over a three roll mill or use other similar systems to obtain viscosity increases.

The product can be easily dispersed as a rheological additive to provide maximum viscosity build through conventional dispersion means in the absence of three roll milling. The organophilic clays of this invention provide an ink composition which when properly dispersed will have a particle size fine enough that no filtering or milling will be necessary to prepare a useable formulation.

While use of a three roll mill may be used to aid in dispersing the ink coloring pigments or materials so that the ink will print satisfactorily on the printing machine, which procedure is commonly required, such passage is not needed to increase viscosity.

A loose three roll mill pass will be necessary in some instances with ink systems where oxidation takes place so that no entrapped air from the dispersion process will cause the formation of small hardened particles of ink.

The invention may also be carried out by adding the organophilic clay gellant to a previously prepared finished printing ink. These inks may be prepared by any usual method such as with colloid mills, roller mills, ball mills, etc. in which the ink pigment material becomes well dispersed in the organic ink vehicle by the high shear used in processing. This dispersion of pigment in the vehicle constitutes a normal ink and has the conventional tendency to mist.

The organophilic clay gellant is employed in amounts sufficient to obtain the desired viscosity value and tack in the printing ink. If necessary, the viscosity may be further controlled by the addition of a viscosity reducing agent, for example, naphthenic oil or solvent.

In general, amounts of the organoclay from 0.1% to 15% by weight of the printing ink is sufficient to greatly reduce the misting tendencies of the ink when utilized in high-speed press printing operations with preferred amounts being from 0.5% to 4% and most preferably from 1% to 3% by weight. When the gellant is employed in concentrations less than 0.1% or greater than 10% by weight of the printing ink, the consistency, flow, and other properties affecting the critical characteristic of the ink are seriously impaired, that is, the desired increase in viscosity and tack is not achieved.

The printing inks of the invention may contain conventional ink additives employed in such printing inks. For example, oil-soluble toners utilized to overcome the brownish tone of mineral oil and carbon black pigment may be employed as well as small amounts of waxes or greases to impart special properties to the printing ink.

The printing inks which may be used with the gellants of the present invention include, but are not limited to, heat set or newsprint ink, water or steam set ink, or lithographic printing ink.

Newsprint inks dry mainly by penetration and absorption, although some heat is utilized to speed drying and prevent smudging. By properly controlling viscosity, tack and yield point with such inks, the organophilic clays of the invention achieve proper penetration in an efficient manner without centrifugal throw off or misting.

When the organophilic clays of the invention are employed with other heat set typographic inks, such as high grade inks for periodicals which contain additives such as binders plus solvents, the inks are extremely flexible, non-smudging, print well, and set rapidly at high temperatures.

The use of the gellant in steam or water set inks greatly affects viscosity and tack by producing a characteristic shortness in the ink.

In contrast, lithographic printing inks are very similar in composition to typographic inks, except that the body is somewhat greater, and pigment concentration is higher. The benefits of using the organophilic clays given above applies here also.

The following examples are given to illustrate the invention, but are not deemed to be limiting thereof. All percentages given throughout the specification are based upon weight unless otherwise indicated.

In the examples, the following test procedures were employed:

Dispersion

The test ink was drawn down in both channels of a NPIRI G-1 Grindometer and then checked for fineness of grind (small particles) and scratches. The gauge scale reads from "10" to "0". A reading of 10 corresponds to a depth of one mil and a reading of 0 is zero depth. Samples were drawn down so that a minimum of four separate gauge readings were taken and averaged out. Perfect readings for a test sample would be "0" for both fineness of grind and scratches.

Viscosity

Viscosity was measured using a Thwing-Albert falling rod viscometer at a block temperature of 78° F. Air was removed from the ink by simple spatulation and then a rod was completely coated with the ink sample. Three weights were used for obtaining fall time values: 700, 500, 200 grams. These weights were repeated and the data run on a Hewlett-Packard computer to obtain the predicted Bingham viscosity in poise at 1000 sec.$^{-1}$. The viscosity value chosen for the tables was taken using the data which contained the smallest root mean square deviation from a straight line calculated from the Bingham Equation $$f_B = T - D_B M_B$$

which is the intercept on the shear stress axis when the shear rate is zero.

$f_B$ is the yield value.
T is the shear stress.
$D_B$ is the shear rate.
$M_B$ is the viscosity.

The organophilic clay gellants were evaluated in a web offset, heatset base red ink formulation prepared with the ingredients set forth in Table I and passed once over a three roll mill to obtain a fine ink dispersion. The rheological additive was then added slowly to the base ink under the least amount of agitation possible to prevent spill out. Dispersion was then obtained at 3000 rpm on a 0.5 H.P. Premier Dispersator Unit using a 1.75 inch diameter Cowles blade. Proper speed was maintained for the indicated mixing time. Measurements of viscosity were conducted following dispersion.

Separate ink samples were treated with different organophilic clay derivatives and comparative material at a 2% by weight level.

Comparative example 1 did not use a rheological additive whereas Comparative example 2 employed fine particle size silica identified commercially as Aerosil R-972 (DeGussa Inc.). Comparative examples 3 to 4 employed a reaction product of Wyoming bentonite and benzyl trihydrogenated tallow ammonium chloride and methyl trihydrogenated tallow ammonium chloride, respectively, having the noted milliequivalent ratios. The inventive examples employed various organic cations and organic anions, which are denoted below. The inventive organophilic clay gellants comprised an organic cation at a milliequivalent ratio of 122.5 and an organic anion at a milliequivalent ratio of 22.5, unless otherwise noted in the examples.

The results are set forth in Table II. As the results indicate, the comparative rheological additive exhibited a poor fineness of grind and/or lower gelling efficiency than the inventive formulations.

TABLE I
WEB OFFSET, HEATSET BASE INK FORMULATION - RED

| Component | Supplier | Generic Name | % of Formulation |
|---|---|---|---|
| Lo-Cal A-7-T | Lawter Chemicals | Heat Set Varnish | 51 |
| Heat Set Microwax Compound C-219 | Dyall* | | 6 |
| Heat Set Fischer-Tropsch Was C-188 | Dyall* | Heat Set Fischer-Tropsch Wax | 4 |
| Lithol Rubine 66-PP-0229 | BASF-Wyandotte | Heat Set, pre-dispersed red paste | 31 |
| Ionol (15% w/w in Magiesol) | Shell Chemical | Antioxidant | 2 |
| Magiesol 47 | Magie Bros. | High boiling hydrocarbon solvent (median boiling point 470° F.) | 9.3 |
| | | Base Total | 98.0% |
| Rheological Additive | | | 2.0% |
| | | Final Mix Total | 100% |

*Dyall is a subsidiary of Lawter Chemicals

TABLE II

| Examples | Rheological Additives | Mixing Time Min. | Fineness of Grind | Scratches | Initial Viscosity (poise) |
|---|---|---|---|---|---|
| Comparative | | | | | |
| 1 | Blank | 20 | 0 | 0 | 43 |
| 2 | Fumed Silica | 15 | 10 | 0 | 58 |
| 3 | B3HT(114ME) | 20 | 0 | 0 | 62 |
| 4 | M3HT(115ME) | 20 | 0 | 0 | 58 |
| Inventive | | | | | |
| 1 | AM2HT/Na Benzoate(1) | 20 | 0 | 0 | 63 |
| 2 | BM2HT/NA Benzoate(2) | 20 | 0 | 0 | 78 |
| 3 | EM2HT/Na Benzoate(3) | 20 | 0 | 1 | 64 |
| 4 | 2M2HT/Na Benzoate(4) | 20 | 0 | 1 | 64 |
| 5 | AM2HT/Na Salicylate | 20 | 0 | 0 | 64 |
| 6 | BM2HT/Na Salicylate | 20 | 0 | 0 | 65 |
| 7 | 2M2HT/Na Salicylate | 20 | 0 | 1 | 93 |
| 8 | BM2HT/Na Phthalate | 20 | 0 | 2 | 65 |
| 9 | AM2HT/Na Octoate | 20 | 0 | 1 | 62 |
| 10 | BM2HT/Na Laurate | 20 | 0 | 1 | 67 |
| 11 | AM2HT/Na Stearate | 20 | 0 | 1 | 95 |
| 12 | BM2HT/Na Stearate | 20 | 0 | 1 | 68 |
| 13 | AM2HT/12-HSA(5) | 20 | 0 | 1 | 67 |
| 14 | BM2HT/12-HSA(6) | 20 | 0 | 2 | 64 |
| 15 | AM2HT (115ME)/PPS(15ME) | 20 | 0 | 0 | 61 |
| 16 | AM2HT/PPS | 20 | 0 | 0 | 71 |
| 17 | AM2HT(130ME)/PPS(30ME) | 20 | 0 | 0 | 69 |
| 18 | BM2HT(115ME)/PPS(15ME) | 20 | 0 | 0 | 65 |
| 19 | BM2HT/PPS | 20 | 0 | 1 | 60 |
| 20 | BM2HT(130ME)PPS(30ME) | 20 | 0 | 0 | 68 |

(1)AM2HT is allyl methyl dihydrogenated tallow
(2)BM2HT is benzyl methyl dihydrogenated tallow
(3)EM2HT is ethanol methyl dihydrogenated tallow
(4)2M2HT is dimethyl dihydrogenated tallow
(5)12-HSA is 12-hydroxystearic acid, sodium salt
(6)PPS is p-phenolsulfonic acid, sodium salt The invention being thus described, it is obvious that the same may be varied in many ways, such variations are not to be regarded as a departure for the spirit and scope of the invention.

We claim:

1. A printing ink comprising an organic ink vehicle having dispersed therein an ink coloring material and an organophilic clay gellant comprising the reaction product of (a) a smectite-type clay having a cation exchange capacity of at least 75 milliequivalents per 100 grams of said clay, (b) an organic anion derived from an organic acid having a $pK_A$ less than about 11.0, said organic anion being present in the range of from 10 to 50 milliequivalents per 100 grams of clay, 100% active clay basis, and (c) an organic cation selected from the group consisting of:

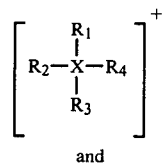

and

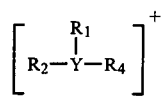

wherein X is nitrogen or phosphorus, Y is sulfur, and wherein $R_1$ is an alkyl group containing 12 to 22 carbon atoms, and wherein $R_2$, $R_3$ and $R_4$ are selected from the group consisting of hydrogen, saturated and unsaturated alkyl groups containing 1 to 22 carbon atoms, aryl groups, aralkyl groups containing 1 to 22 carbon atoms on the alkyl chain, hydroxyalkyl groups having 2 to 6 carbon atoms and mixtures thereof, said organic cation being present in a sufficient quantity to at least satisfy the cation exchange capacity of the clay and the cationic activity of the organic anion, wherein an organic cation—organic anion complex is intercalated with the smectite-type clay and the cation exchange sites of the smectite-type clay are substituted with the organic cation.

2. A process for preparing a printing ink comprising:
(1) forming a dispersion of an ink coloring material with an organic ink vehicle;
(2) preparing an organophilic clay gellant comprising the reaction product of:
  (a) a smectite-type clay having a cation exchange capacity of at least 75 milliequivalents per 100 grams of said clay;
  (b) an organic anion derived from an organic acid having a $pK_A$ less than about 11.0, said organic anion being present in the range of from 10 to 50 milliequivalents per 100 grams of clay, 100% active clay basis; and
  (c) an organic cation selected from the group consisting of:

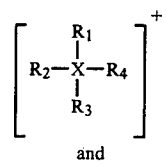

and

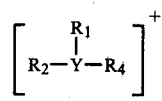

wherein X is nitrogen or phosphorus, Y is sulfur, and wherein $R_1$ is an alkyl group containing 12 to 22 carbon atoms, and wherein $R_2$, $R_3$ and $R_4$ are selected from the group consisting of hydrogen, saturated and unsaturated alkyl groups containing 1 to 22 carbon atoms, aryl groups, aralkyl groups containing 1 to 22 carbon atoms on the alkyl chain, hydroxyalkyl groups having 2 to 6 carbon atoms and mixtures thereof, said organic cation being present in a sufficient quantity to at least satisfy the cation exchange capacity of the clay and the cationic activity of the organic anion, wherein an organic cation—organic anion complex is intercalated with the smectite-type clay and the cation exchange sites of the smectite-type clay are substituted with the organic cation; and
(3) dispersing said organophilic clay gellant in said dispersion to prepare a viscous printing ink.

3. The printing ink of claim 1 wherein the smectite-type clay is selected from the group consisting of hectorite and sodium bentonite.

4. The printing ink of claim 1 wherein the amount of said organic cation is from 100 to 160 milliequivalents per 100 grams of clay, 100% active clay basis.

5. The printing ink of claim 1 wherein said organophilic clay gellant comprises from 0.1% to 15% by weight of said printing ink.

6. The printing ink of claim 1 wherein said organophilic clay gellant comprises from 1.0% to 3.0% by weight of said printing ink.

7. The proccess of claim 2 wherein said clay is hectorite or sodium bentonite.

8. The process of claim 2 wherein said organophilic clay gellant comprises from 0.1% to 15% by weight of said printing ink.

* * * * *